April 3, 1928.
W. A. CHRYST
1,664,540
DYNAMO FRAME
Filed Aug. 27, 1925
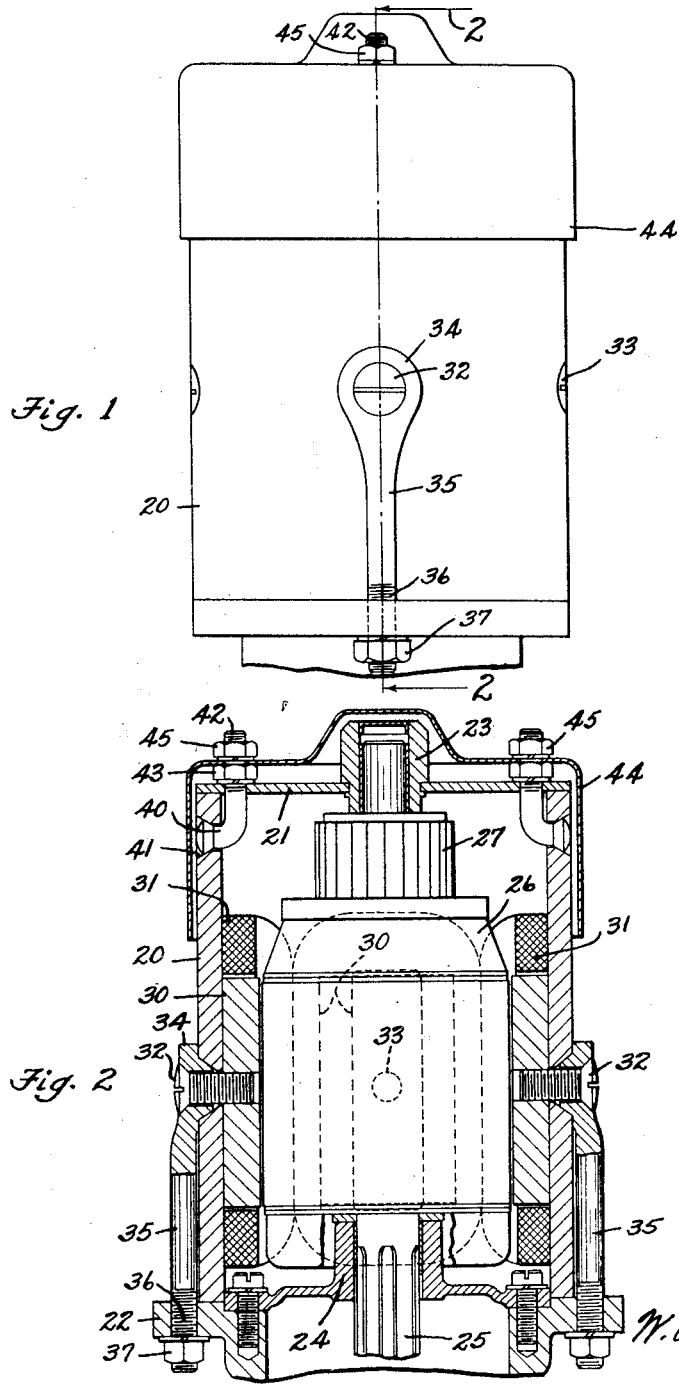
Inventor
W. A. Chryst
By Spencer Small & Hardman
his Attorneys Patented Apr. 3, 1928.

1,664,540

UNITED STATES PATENT OFFICE.

WILLIAM A. CHRYST, OF DAYTON, OHIO, ASSIGNOR, BY MESNE ASSIGNMENTS, TO DELCO-REMY CORPORATION, OF DAYTON, OHIO, A CORPORATION OF DELAWARE.

DYNAMO FRAME.

Application filed August 27, 1925. Serial No. 52,927.

This invention relates to frames for dynamo-electric machines and particularly to small, compact machines which are used on automobiles.

One of the objects of the invention is to construct the frame of the dynamo-electric machine, so that a maximum amount of space will be available for the electrical windings of the machine. It has been the practice to construct a field frame for a small dynamo, by providing a cylindrical field frame having spaced pole pieces on the interior thereof, each surrounded by a field winding. The end frames are attached to the field frame by through bolts extending adjacent the interior of the field shell and between the field windings.

The objects of the present invention are accomplished by eliminating these through bolts so that all of the space in the interior of the field frame and surrounding the armature will be available for field windings.

Further objects and advantages of the present invention will be apparent from the following description, reference being had to the accompanying drawings, wherein a preferred form of the present invention is clearly shown.

In the drawings:

Fig. 1 is a side elevation of a dynamo frame embodying the present invention; and Fig. 2 is a sectional view on the line 2—2 of Fig. 1

Referring to the drawings, 20 designates a cylindrical field shell, and 21 and 22 are the end frames for supporting bearings 23 and 24, respectively, within which a shaft 25 is journaled. Shaft 25 carries an armature 26 and a commutator 27. The commutator brushes are not shown, but they may be mounted on brackets supported by the frame 21, in any desired manner.

The frame 20 supports a plurality of pole pieces 30 each surrounded by a field winding 31. As shown in Fig. 2, the windings are relatively wide and flat, and are packed closely together against the interior of the shell 20. By using relatively flat windings, the thickness of the poles 30, and consequently the external diameter of the shell 20 may be reduced to the minimum. In order to place the desired number of field turns around each field pole piece 30 it is necessary that the windings 31 be relatively wide. In order to pack them in a small space, it will be necessary that the coils 31 substantially touch each other between the pole pieces 30. This construction does not permit the use of through bolts for tying the frames 21 and 22 together.

The pole pieces 30 are attached to the field shell 20 by screws 32 and 33. The screw 32 passes through the eyes 34 of tie bolts 35, having their shanks threaded at 36 and extending through holes in the end frame 22 and receiving nuts 37, which, when tightened, will clamp the frame 20 to the frame 22.

The frame 21 is attached to the field frame 20 by angle bolts 40 having their heads received by the countersunk portions 41 of holes in the field frame 20, through which the bolts 40 extend. The bolts have threaded shanks 42 extending through the holes in the end frame 21 and nuts 43 cooperate with the bolts 40 for clamping the frame 21 against the frame 20.

Where the dynamo is mounted vertically and is exposed to moisture, it is provided with a cover 44 having holes for receiving the threaded ends 42 of the bolts 40. Nuts 45 cooperate with the threaded ends 42 to clamp the cover 44 against the nuts 43.

While the form of embodiment of the invention as herein disclosed, constitutes a preferred form, it is to be understood that other forms might be adopted, all coming within the scope of the claims which follow.

What is claimed is as follows:

1. A dynamo frame comprising, in combination, a field shell, pole pieces, an end frame adapted to abut the end of the field frame, bolts having threaded shanks extending through the end frame, and located along the exterior of the field shell, common means for securing to the exterior of the shell a portion of the bolt and to the interior of the shell a pole piece, and nuts cooperating with the threaded shanks of the bolts for clamping the end frame to the shell.

2. A dynamo frame comprising, in combination, a field shell, pole pieces, an end frame adapted to abut the end of the field frame, bolts having threaded shanks extending through the end frame and located along the exterior of the field shell and having apertured heads, and screws passing through the apertured heads and field shell and having threaded engagement with the pole pieces whereby to secure the bolt heads and pole pieces to the shell, and nuts cooperating with the threaded shanks of the bolts for clamping the end frame to the shell.

In testimony whereof I hereto affix my signature.

WILLIAM A. CHRYST.